Figure 1:
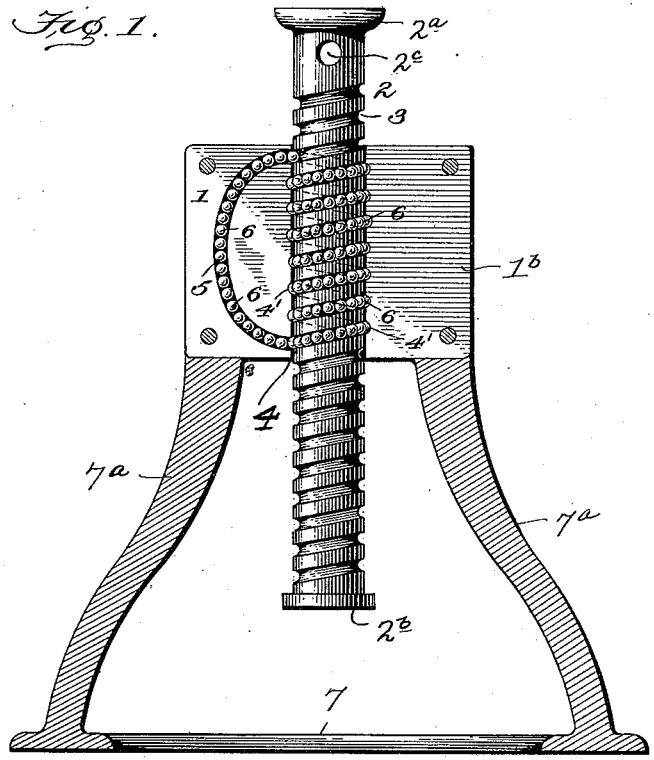

(No Model.)

H. M. STEVENSON.
LIFTING JACK.

No. 601,451. Patented Mar. 29, 1898.

WITNESSES:
Edwin L. Bradford
H. J. Ennis.

INVENTOR
H. M. Stevenson
BY
Lacey,
ATTORNEYS.

UNITED STATES PATENT OFFICE.

HENRY MINOR STEVENSON, OF PERRY, IOWA.

LIFTING-JACK.

SPECIFICATION forming part of Letters Patent No. 601,451, dated March 29, 1898.

Application filed April 21, 1897. Serial No. 633,100. (No model.)

*To all whom it may concern:*

Be it known that I, HENRY MINOR STEVENSON, a citizen of the United States, residing at Perry, in the county of Dallas and State of Iowa, have invented certain new and useful Improvements in Lifting-Jacks; and I do hereby declare the following to be a full, clear, and exact description of the invention, such as will enable others skilled in the art to which it appertains to make and use the same.

My invention relates to improvements in lifting-jacks of that class wherein a screw-shaft member operates within a threaded orifice in a bearing member; and its object is to provide a novel construction of jack and a simple, durable, and effective antifriction-bearing therefor.

To this end the novelty consists in the constructions, combinations, and arrangements of parts hereinafter more fully described, and particularly pointed out in the appended claim.

In the accompanying drawings the same reference characters indicate the same parts of the invention.

Figure 2:
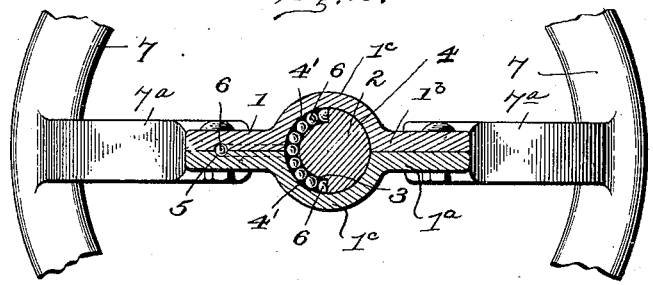

Figure 1 is a vertical section of a screw-jack having my improved bearing applied thereto. Fig. 2 is a transverse section of the same.

Referring now more particularly to the accompanying drawings, 1 represents a fixed bearing or socket member carried by standards or arms $7^a$, rising from and integrally connected with an annular base-piece 7. This socket is constructed of two sections $1^a$ $1^b$, each provided with a vertical semicylindrical central portion $1^c$, forming in conjunction, when the said two sections are fitted together, a vertical orifice 4. The section $1^a$ is cast integrally with the base 7 and standards $7^a$, while the other section $1^b$ is detachable and secured by bolts $1^d$ or other suitable fastening devices to the said section $1^a$, as shown. The cylindrical shaft 2 slides freely through the vertical orifice 4 and is formed with a spiral groove 3, which is semicircular in cross-section and which extends almost from end to end of the shaft. The said shaft is also provided at each end with a head $2^a$ $2^b$ and adjacent the head $2^a$ with an opening $2^c$ for the reception of a crowbar or other implement for operating the shaft. The socket member 1 is also provided with a spiral groove $4'$, formed in the wall of its orifice, and it is likewise semicircular in cross-section and of the same relative pitch diameter as the groove 3 in the shaft 2.

5 represents a lateral cylindrical passage-way formed by alined grooves in the socket-sections $1^a$ $1^b$, connecting the upper and lower ends of the groove $4'$.

6 6 represent a continuous series of bearing-balls the uniform diameter of which corresponds to the diameter of the grooves and the cylindrical passage-way 5. As will be seen, these balls project half-way into the groove 3 in the shaft 2 and half-way in the groove $4'$ in the socket member 1, and they completely fill the passage-way 5 and thus form a continuous ball-bearing thread for the shaft in the socket.

Of course it will be understood that the bearing-balls enter and leave the upper and lower ends of the passage-way according to the direction in which the shaft 2 is turned, and as they enter one end they leave at the other to preserve the continuity of the thread between the shaft and socket member.

Having thus fully described my invention, what I claim as new, and desire to secure by Letters Patent of the United States, is—

In a lifting-jack, the combination of a fixed base provided with standards or arms projecting upwardly therefrom, a stationary bearing or socket member 1 comprising two vertical sections $1^a$, $1^b$, one of which is cast integrally with said standards or arms and the other detachable and bolted to said integral section, each of said sections having a semicylindrical central portion $1^c$ forming in conjunction a vertical orifice 4 having a spiral semicircular groove $4'$, and alined grooves forming a continuous passage-way 5 connecting the opposite ends of said spiral groove $4'$, a movable cylindrical shaft member extending through said orifice 4 and provided with a spiral semicircular groove 3 and at one end with a head $2^a$, and a series of bearing-balls 6 filling the alined grooves in the shaft and socket members, substantially as described.

In testimony whereof I affix my signature in presence of two witnesses.

HENRY MINOR STEVENSON.

Witnesses:
W. H. FAHEY,
O. F. RODDON.